United States Patent
Tuli

(10) Patent No.: US 9,213,044 B2
(45) Date of Patent: Dec. 15, 2015

(54) DEVIATIONAL PLANE WRIST INPUT

(71) Applicant: Nokia Technologies Oy, Espoo (FI)

(72) Inventor: Apaar Tuli, Helsinki (FI)

(73) Assignee: Nokia Technologies OY, Espoo (FI)

( * ) Notice: Subject to any disclaimer, the term of this patent is extended or adjusted under 35 U.S.C. 154(b) by 52 days.

(21) Appl. No.: 14/053,410

(22) Filed: Oct. 14, 2013

(65) Prior Publication Data

US 2015/0101423 A1    Apr. 16, 2015

(51) Int. Cl.
| | |
|---|---|
| G06F 3/033 | (2013.01) |
| G09G 5/08 | (2006.01) |
| G01P 13/00 | (2006.01) |
| G06F 1/16 | (2006.01) |
| G06F 3/01 | (2006.01) |

(52) U.S. Cl.
CPC ............... *G01P 13/00* (2013.01); *G06F 1/163* (2013.01); *G06F 3/014* (2013.01); *G06F 3/017* (2013.01); *G06F 2200/1637* (2013.01)

(58) Field of Classification Search
CPC ..... G06F 3/03393; G06F 3/042; G06F 3/038; G06F 1/1626; G06F 3/0304
USPC .......................... 345/156–158, 179, 173–175
See application file for complete search history.

(56) References Cited

U.S. PATENT DOCUMENTS

| | | | |
|---|---|---|---|
| 5,444,462 A * | 8/1995 | Wambach | 345/158 |
| 5,952,931 A * | 9/1999 | Chotichanon et al. | 340/649 |
| 2012/0194976 A1 | 8/2012 | Golko et al. | |
| 2013/0234924 A1 | 9/2013 | Janefalkar et al. | |

FOREIGN PATENT DOCUMENTS

| | | |
|---|---|---|
| EP | 2741176 A2 | 6/2014 |
| WO | 2009093027 A1 | 7/2009 |

OTHER PUBLICATIONS

International Search Report and Written Opinion received in Patent Cooperation Treaty Application No. PCT/FI2014/050772, dated Jan. 20, 2015, 12 pages.

* cited by examiner

*Primary Examiner* — Kimnhung Nguyen
(74) *Attorney, Agent, or Firm* — Banner & Witcoff

(57) ABSTRACT

A method comprising causing display of at least one interface element on a display that is configured to be oriented on a wrist of a user, receiving information indicative of a deviational plane wrist input indicative of physical movement in a deviational plane direction with respect to the deviational plane, determining an interaction operation based, at least in part, on the interface element and an interaction direction; and causing performance of the interaction operation is disclosed.

20 Claims, 10 Drawing Sheets

Supination 301    Pronation 302

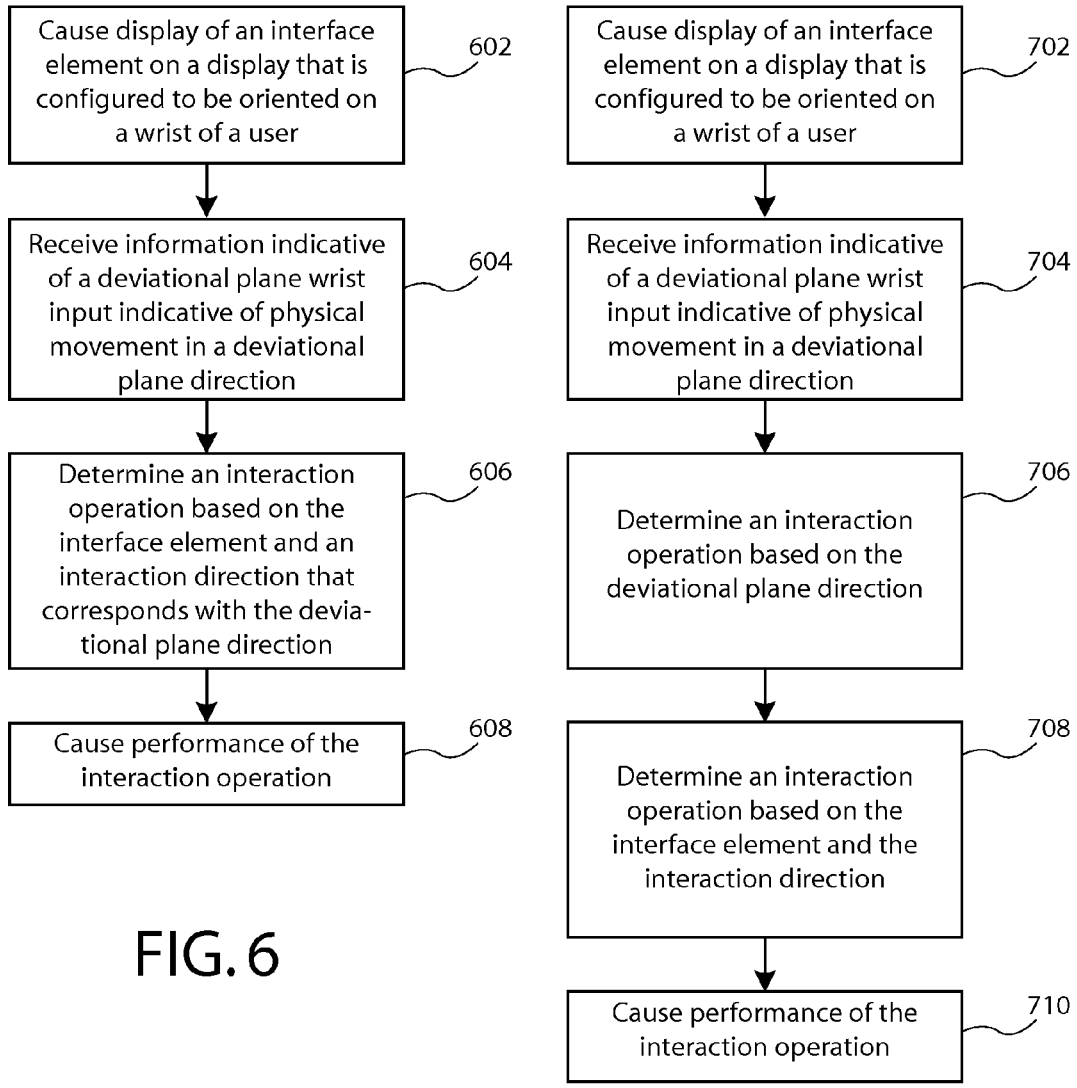

DEVIATIONAL PLANE WRIST INPUT

TECHNICAL FIELD

The present application relates generally to a deviational plane wrist input.

BACKGROUND

Many users have become dependent on electronic apparatuses to manage various aspects of their lives. For example, many users keep track of many of their appointments, meetings and other events in a calendar program on their electronic apparatus. In addition, many users utilize electronic apparatuses for communication and determining occurrence of various events. It may be desirable to allow users to interact with electronic apparatuses in a simple and intuitive manner.

SUMMARY

Various aspects of examples of the invention are set out in the claims.

One or more embodiments may provide an apparatus, a computer readable medium, a non-transitory computer readable medium, a computer program product, and a method for causing display of at least one interface element on a display that is configured to be oriented on a wrist of a user such that a top of the display is proximate to an ulna of the user and a bottom of the display is proximate to a radius of the user, receiving information indicative of a deviational plane wrist input indicative of physical movement in a deviational plane direction, the deviational plane being a plane that aligns with radial deviation of the wrist and ulnar deviation of the wrist, the deviational plane direction being a direction with respect to the deviational plane, determining an interaction operation based, at least in part, on the interface element and an interaction direction that corresponds with the deviational plane direction, and causing performance of the interaction operation.

One or more embodiments may provide an apparatus, a computer readable medium, a computer program product, and a non-transitory computer readable medium having means for causing display of at least one interface element on a display that is configured to be oriented on a wrist of a user such that a top of the display is proximate to an ulna of the user and a bottom of the display is proximate to a radius of the user, means for receiving information indicative of a deviational plane wrist input indicative of physical movement in a deviational plane direction, the deviational plane being a plane that aligns with radial deviation of the wrist and ulnar deviation of the wrist, the deviational plane direction being a direction with respect to the deviational plane, means for determining an interaction operation based, at least in part, on the interface element and an interaction direction that corresponds with the deviational plane direction, and means for causing performance of the interaction operation.

In at least one example embodiment, the display is configured to be worn such that the display is substantially parallel with the deviational plane.

In at least one example embodiment, the deviational plane relates to a plane that corresponds with a frontal plane when the wrist is in an anatomic position.

In at least one example embodiment, the deviational plane aligns with radial deviation of the wrist and ulnar deviation of the wrist regardless of supination of the wrist and regardless of pronation of the wrist.

In at least one example embodiment, the direction with respect to the deviational plane relates to at least one of a radial direction or an ulnar direction.

In at least one example embodiment, the radial direction relates to a direction on the deviational plane that corresponds with wrist movement from a neutral position towards a radial deviation.

In at least one example embodiment, the ulnar direction relates to a direction on the deviational plane that corresponds with wrist movement from a neutral position towards an ulnar deviation.

In at least one example embodiment, the physical movement relates to at least one of an ulnar deviation or a radial deviation.

In at least one example embodiment, the physical movement relates to at least one of adduction or abduction.

In at least one example embodiment, the physical movement relates to abduction of the thumb, and the deviational plane direction relates to a radial direction.

In at least one example embodiment, an upward interaction direction corresponds with an ulnar deviational plane direction.

In at least one example embodiment, a downward interaction direction corresponds with a radial deviational plane direction.

In at least one example embodiment, the physical movement relates to a change from a neutral physical position with respect to the deviational plane, to a non-neutral physical position with respect to the deviational plane.

In at least one example embodiment, the non-neutral physical position relates to at least one of a wrist extension position, a wrist flexion position, an ulnar deviation position, a radial deviation position, or a finger abduction position.

In at least one example embodiment, the physical movement comprises at least one of wrist flexion or wrist extension, and the deviational plane direction relates to a direction that is a geometric normal to the deviational plane.

In at least one example embodiment, the physical movement comprises wrist flexion, and the deviational plane direction relates to a geometric normal below the deviational plane.

In at least one example embodiment, a rightward interaction direction corresponds with the geometric normal below the deviational plane.

In at least one example embodiment, the physical movement comprises wrist extension, and the deviational plane direction relates to a geometric normal above the deviational plane.

In at least one example embodiment, a leftward interaction direction corresponds with the geometric normal above the deviational plane.

In at least one example embodiment, the interaction operation relates to a selection operation.

In at least one example embodiment, the selection operation relates to selection of an interface element.

In at least one example embodiment, the interaction operation relates to causation of display of menu item interface elements.

One or more example embodiments further perform determination of the interaction direction based, at least in part, on the deviational plane direction.

In at least one example embodiment, the deviational plane direction is independent of finger flexion.

In at least one example embodiment, the deviational plane direction is independent of finger extension.

One or more example embodiments further perform receipt of information indicative of a neutral deviational plane wrist input.

In at least one example embodiment, the neutral deviational plane wrist input relates to a wrist being in a neutral position.

One or more example embodiments further perform causation of display of at least one different interface element, receipt of information indicative of a different deviational plane wrist input, wherein the interface element is based, at least in part, on the different interface element and the different deviational plane wrist input, and causation of termination of display of the different interface element based, at least in part, on the different deviational plane wrist input, wherein the causation of display of the interface element is based, at least in part, on the different deviational plane wrist input.

In at least one example embodiment, the interface element relates to a menu item associated with the different interface element.

In at least one example embodiment, the different deviational plane wrist input is indicative of a wrist flexion.

One or more example embodiments further perform determination that an event occurred, wherein the different interface element relates to a notification of occurrence of the event.

In at least one example embodiment, the event relates to at least one of a receipt of a call, a receipt of a message, a calendar event, or an alarm event.

One or more example embodiments further perform causation of display of another interface element that is below the interface element, wherein the deviational plane wrist input direction relates to an ulnar direction, the interaction direction relates to an upward direction, and the interaction operation relates to selection of the interface element.

In at least one example embodiment, determination of the interaction operation comprises determination that the interface element corresponds with the interaction direction.

In at least one example embodiment, determination that the interface element corresponds with the interaction direction relates to determination that a position indicated by the interaction direction relates to the interface element.

In at least one example embodiment, the interaction direction indicates a position based, at least in part, on an application of an offset from a center of the display in the interaction direction.

BRIEF DESCRIPTION OF THE DRAWINGS

For a more complete understanding of embodiments of the invention, reference is now made to the following descriptions taken in connection with the accompanying drawings in which:

FIG. 6 is a flow diagram illustrating activities associated with a deviational plane wrist input according to at least one example embodiment;

FIG. 7 is a flow diagram illustrating activities associated with a deviational plane wrist input according to at least one example embodiment;

DETAILED DESCRIPTION OF THE DRAWINGS

Figure 1:
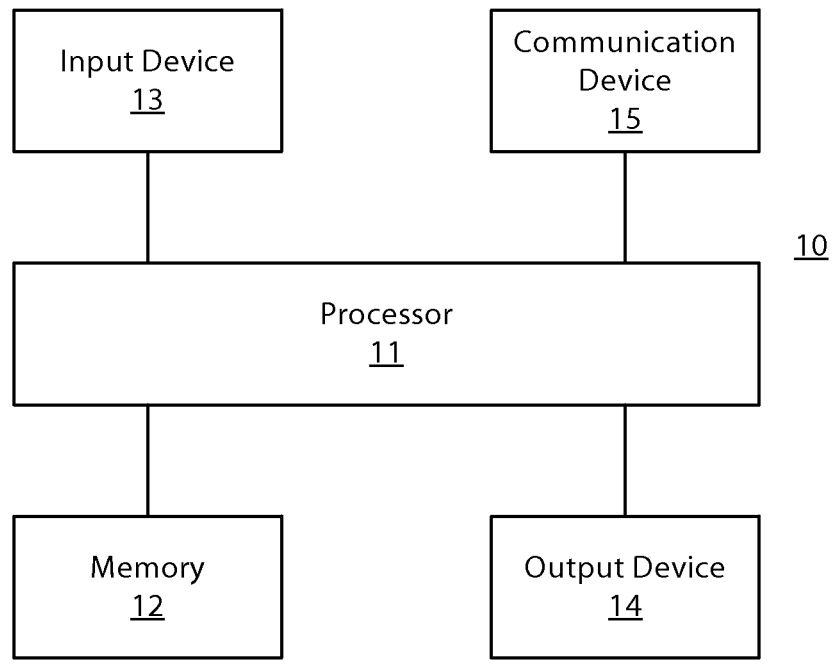
FIG. 1 is a block diagram showing an apparatus according to an example embodiment.

An embodiment of the invention and its potential advantages are understood by referring to FIGS. 1 through 12 of the drawings.

Some embodiments will now be described more fully hereinafter with reference to the accompanying drawings, in which some, but not all, embodiments are shown. Various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network apparatus, other network apparatus, and/or other computing apparatus.

As defined herein, a "non-transitory computer-readable medium," which refers to a physical medium (e.g., volatile or non-volatile memory device), can be differentiated from a "transitory computer-readable medium," which refers to an electromagnetic signal.

FIG. 1 is a block diagram showing an apparatus, such as an electronic apparatus 10, according to at least one example embodiment. It should be understood, however, that an electronic apparatus as illustrated and hereinafter described is merely illustrative of an electronic apparatus that could benefit from embodiments of the invention and, therefore, should not be taken to limit the scope of the invention. While electronic apparatus 10 is illustrated and will be hereinafter described for purposes of example, other types of electronic apparatuses may readily employ embodiments of the invention. Electronic apparatus 10 may be a portable digital assistant (PDAs), a pager, a mobile computer, a desktop computer, a television, a gaming apparatus, a laptop computer, a media player, a camera, a video recorder, a mobile phone, a global positioning system (GPS) apparatus, and/or any other types of electronic systems. Moreover, the apparatus of at least one example embodiment need not be the entire electronic apparatus, but may be a component or group of components of the electronic apparatus in other example embodiments.

Furthermore, apparatuses may readily employ embodiments of the invention regardless of their intent to provide mobility. In this regard, even though embodiments of the invention may be described in conjunction with mobile applications, it should be understood that embodiments of the invention may be utilized in conjunction with a variety of other applications, both in the mobile communications industries and outside of the mobile communications industries.

In at least one example embodiment, electronic apparatus 10 comprises processor 11 and memory 12. Processor 11 may be any type of processor, controller, embedded controller, processor core, and/or the like. In at least one example embodiment, processor 11 utilizes computer program code to cause an apparatus to perform one or more actions. Memory 12 may comprise volatile memory, such as volatile Random Access Memory (RAM) including a cache area for the temporary storage of data and/or other memory, for example, non-volatile memory, which may be embedded and/or may be removable. The non-volatile memory may comprise an EEPROM, flash memory and/or the like. Memory 12 may store any of a number of pieces of information, and data. The information and data may be used by the electronic apparatus 10 to implement one or more functions of the electronic apparatus 10, such as the functions described herein. In at least one example embodiment, memory 12 includes computer program code such that the memory and the computer program code are configured to, working with the processor, cause the apparatus to perform one or more actions described herein.

The electronic apparatus 10 may further comprise a communication device 15. In at least one example embodiment, communication device 15 comprises an antenna, (or multiple antennae), a wired connector, and/or the like in operable communication with a transmitter and/or a receiver. In at least one example embodiment, processor 11 provides signals to a transmitter and/or receives signals from a receiver. The signals may comprise signaling information in accordance with a communications interface standard, user speech, received data, user generated data, and/or the like. Communication device 15 may operate with one or more air interface standards, communication protocols, modulation types, and access types. By way of illustration, the electronic communication device 15 may operate in accordance with second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), and/or with fourth-generation (4G) wireless communication protocols, wireless networking protocols, such as 802.11, short-range wireless protocols, such as Bluetooth, and/or the like. Communication device 15 may operate in accordance with wireline protocols, such as Ethernet, digital subscriber line (DSL), asynchronous transfer mode (ATM), and/or the like.

Processor 11 may comprise means, such as circuitry, for implementing audio, video, communication, navigation, logic functions, and/or the like, as well as for implementing embodiments of the invention including, for example, one or more of the functions described herein. For example, processor 11 may comprise means, such as a digital signal processor device, a microprocessor device, various analog to digital converters, digital to analog converters, processing circuitry and other support circuits, for performing various functions including, for example, one or more of the functions described herein. The apparatus may perform control and signal processing functions of the electronic apparatus 10 among these devices according to their respective capabilities. The processor 11 thus may comprise the functionality to encode and interleave message and data prior to modulation and transmission. The processor 1 may additionally comprise an internal voice coder, and may comprise an internal data modem. Further, the processor 11 may comprise functionality to operate one or more software programs, which may be stored in memory and which may, among other things, cause the processor 11 to implement at least one embodiment including, for example, one or more of the functions described herein. For example, the processor 11 may operate a connectivity program, such as a conventional internet browser. The connectivity program may allow the electronic apparatus 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic apparatus 10 may comprise a user interface for providing output and/or receiving input. The electronic apparatus 10 may comprise an output device 14. Output device 14 may comprise an audio output device, such as a ringer, an earphone, a speaker, and/or the like. Output device 14 may comprise a tactile output device, such as a vibration transducer, an electronically deformable surface, an electronically deformable structure, and/or the like. Output device 14 may comprise a visual output device, such as a display, a light, and/or the like. In at least one example embodiment, the apparatus causes display of information, the causation of display may comprise displaying the information on a display comprised by the apparatus, sending the information to a separate apparatus that comprises a display, and/or the like. The electronic apparatus may comprise an input device 13. Input device 13 may comprise a light sensor, a proximity sensor, a microphone, a touch sensor, a force sensor, a button, a keypad, a motion sensor, a magnetic field sensor, a camera, and/or the like. A touch sensor and a display may be characterized as a touch display. In an embodiment comprising a touch display, the touch display may be configured to receive input from a single point of contact, multiple points of contact, and/or the like. In such an embodiment, the touch display and/or the processor may determine input based, at least in part, on position, motion, speed, contact area, and/or the like. In at least one example embodiment, the apparatus receives an indication of an input. The apparatus may receive the indication from a sensor, a driver, a separate apparatus, and/or the like. The information indicative of the input may relate to information that conveys information indicative of the input, indicative of an aspect of the input indicative of occurrence of the input, and/or the like.

The electronic apparatus 10 may include any of a variety of touch displays including those that are configured to enable touch recognition by any of resistive, capacitive, infrared, strain gauge, surface wave, optical imaging, dispersive signal technology, acoustic pulse recognition, or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display. A touch display may be capable of receiving information associated with force applied to the touch screen in relation to the touch input. For example, the touch screen may differentiate between a heavy press touch input and a light press touch input. In at least one example embodiment, a display may display two-dimensional information, three-dimensional information and/or the like.

In embodiments including a keypad, the keypad may comprise numeric (for example, 0-9) keys, symbol keys (for example, #, *), alphabetic keys, and/or the like for operating the electronic apparatus 10. For example, the keypad may comprise a conventional QWERTY keypad arrangement. The keypad may also comprise various soft keys with associated functions. In addition, or alternatively, the electronic apparatus 10 may comprise an interface device such as a joystick or other user input interface.

Input device 13 may comprise a media capturing element. The media capturing element may be any means for capturing an image, video, and/or audio for storage, display or transmission. For example, in at least one example embodiment in which the media capturing element is a camera module, the camera module may comprise a digital camera which may form a digital image file from a captured image. As such, the camera module may comprise hardware, such as a lens or other optical component(s), and/or software necessary for creating a digital image file from a captured image. Alternatively, the camera module may comprise only the hardware for viewing an image, while a memory device of the electronic apparatus 10 stores instructions for execution by the processor 11 in the form of software for creating a digital image file from a captured image. In at least one example embodiment, the camera module may further comprise a processing element such as a co-processor that assists the processor 11 in processing image data and an encoder and/or decoder for compressing and/or decompressing image data. The encoder and/or decoder may encode and/or decode according to a standard format, for example, a Joint Photographic Experts Group (JPEG) standard format.

Figure 2:
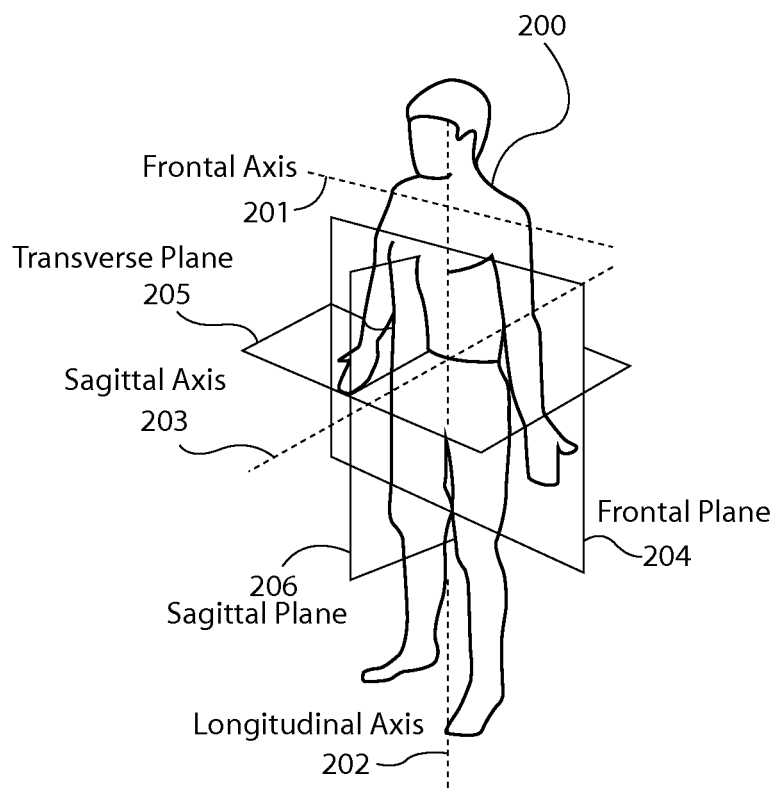
FIG. 2 is a diagram illustrating anatomical terms of location, orientation, and/or the like, with respect to a user.

FIG. 2 is a diagram illustrating anatomical terms of location, orientation, and/or the like, with respect to user 200. It can be seen that user 200 is depicted in an anatomic position.

An anatomic position relates to a posture of a human body in which the body is standing with legs slightly apart with feet forward and palms facing forward. The body of user 200 may be described in relation to three fundamental axes that are orthogonal to each other; the frontal axis, the longitudinal axis, and the sagittal axis. Frontal axis 201 relates to an imaginary line that extends from right to left through a center point or axis of user 200. Longitudinal axis 202 relates to a line that extends from superior (upper) to inferior (lower) through a center point or axis of user 200. Sagittal axis 203 relates to a line that extends from anterior to posterior through a center point or axis of user 200. Frontal plane 204 relates to a plane that divides user 200 into anterior and posterior halves along frontal axis 201 and longitudinal axis 202. It can be seen that, when user 200 is in the anatomical position, the frontal plane divides the wrist and hand of user 200. Transverse plane 205 relates to a plane that divides user 200 into superior and inferior parts through frontal axis 201 and sagittal axis 203. Sagittal plane 206 relates to a plane that divides user 200 into left and right parts through sagittal axis 203 and longitudinal axis 202.

FIGS. 3A-3E are diagrams illustrating movement in relation to a wrist according to at least one example embodiment. The examples of FIGS. 3A-3E are merely examples and do not limit the scope of the claims. For example, sidedness of the wrist may vary, orientation of the various movements may vary, combination of the various movements may vary, and/or the like.

Physical movement with respect to a wrist may be characterized in terms of fundamental movements. For example, a complex wrist movement may be characterized by the manner in which the complex movement incorporates distinct fundamental movements. FIGS. 3A-3E illustrate examples of such fundamental movements. The movements of FIGS. 3A-3E are described in relation to movement from a neutral position. In at least one example embodiment, a neutral position relates to a position of the hand that aligns with the wrist in conformance with the anatomical position with the fingers (including the thumb) of the hand together. In at least one example embodiment, the neutral position relates to a position of the hand that aligns with the wrist in conformance with the anatomical position, with the thumb being together with the hand, absent regard for position of the non-thumb fingers. In at least one example embodiment, the neutral position relates to a position of the hand that aligns with the wrist in conformance with the anatomical position, absent regard for position of the fingers. The particular neutral position that is utilized for any given circumstances may vary.

Figure 3A:
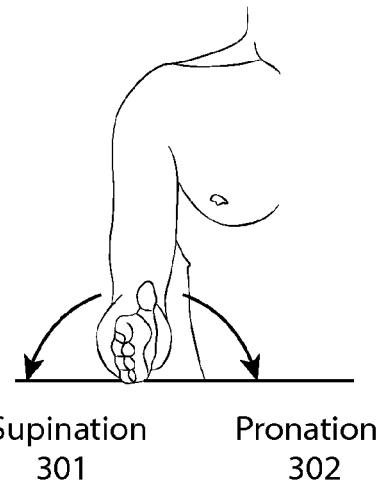
FIGS. 3A-3E are diagrams illustrating movement in relation to a wrist according to at least one example embodiment.

FIG. 3A is a diagram illustrating wrist supination and pronation according to at least one example embodiment. Wrist supination and pronation relate to lateral movement of the forearm that causes rotation of the wrist. Supination 301 relates to forearm movement associated with turning the palm forward (anteriorly) or upward, performed by lateral rotation of the forearm. Pronation 302 relates to forearm movement associated with turning the palm rearward (posteriorly) or downward, performed by lateral rotation of the forearm.

Figure 3B:
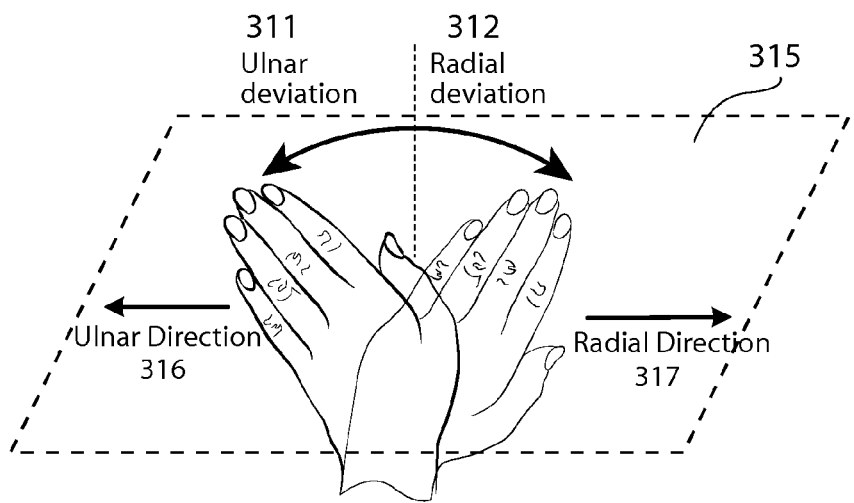

FIG. 3B is a diagram illustrating wrist deviation according to at least one example embodiment. Deviation of the wrist may be described in terms of abduction and adduction. Abduction relates to a motion that pulls a structure away from a midline of the body, and adduction relates to a motion that pulls a structure towards a midline of the body. For example, when the body is in the anatomical position, abduction of the wrist relates to a motion that moves the hand away from the body of the user. Such motion is referred to as a radial deviation, as illustrated by radial deviation 312. For example, radial deviation may bring the hand closer to the radius bone of the forearm. In another example, when the body is in the anatomical position, adduction of the wrist relates to a motion that moves the hand towards the body of the user. Such motion is referred to as an ulnar deviation, as illustrated by ulnar deviation 311. For example, ulnar deviation may bring the hand closer to the ulna bone of the forearm.

It may be desirable to characterize wrist movement in terms of a deviational plane. In at least one example embodiment, the deviational plane relates to a plane that aligns with radial deviation of the wrist and ulnar deviation of the wrist. In at least one example embodiment, the deviation plane corresponds with a frontal plane when the wrist in the anatomical position. For example, supination and pronation of the forearm may cause rotation of the deviational plane in correspondence with the wrist. In this manner, the deviational plane aligns with radial deviation of the wrist and ulnar deviation of the wrist regardless of supination of the wrist and regardless of pronation of the wrist. For example, ulnar deviation still occurs along the deviational plane regardless of supination or pronation of the wrist.

In at least one example embodiment, it may be desirable to characterize movement of the wrist, the hand, the fingers, and/or the like, in terms of movement with respect to the deviational plane. In this manner, movement with respect to the deviational plane may be characterized in terms of a deviational plane direction. The deviational plane direction may relate to an ulnar direction or a radial direction. In at least one example embodiment, the radial direction relates to a direction on the deviational plane that corresponds with wrist movement from a neutral position towards a radial deviation. For example, it can be seen that radial direction 317 extends along deviational plane 315 in a direction that corresponds with radial deviation 312. In at least one example embodiment, the ulnar direction relates to a direction on the deviational plane that corresponds with wrist movement from a neutral position towards an ulnar deviation. For example, it can be seen that ulnar direction 316 extends along deviational plane 315 in a direction that corresponds with ulnar deviation 311.

Figure 3C:
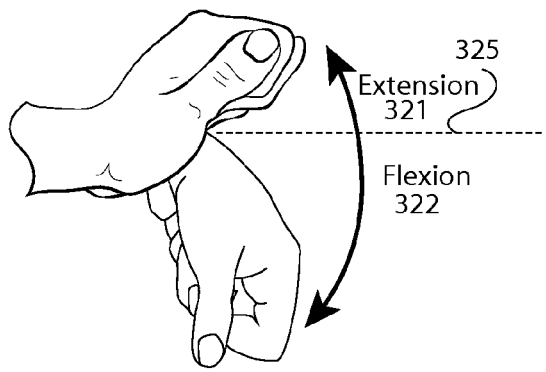

FIG. 3C is a diagram illustrating wrist flexion and extension according to at least one example embodiment. It can be seen that wrist extension relates to a wrist movement associated with bringing the top of the hand towards the top of the forearm and that wrist flexion relates to bringing the palm of the hand towards the bottom of the forearm. FIG. 3C illustrates wrist extension 321 and wrist flexion 322 in relation to deviational plane 325. It can be seen that wrist extension 321 relates to a motion in a direction extending above deviational plane 325 and that wrist flexion 322 relates to a motion in a direction below deviational plane 325. In at least one example embodiment, a physical movement that comprises wrist flexion or wrist extension relates to a motion that has a deviational plane direction that is a geometric normal to the deviational plane. For example, wrist flexion may relate to a deviational plane direction of a geometric normal below the deviational plane. In another example, wrist extension may relate to a deviational plane direction of a geometric normal above the deviational plane.

Figure 3D:
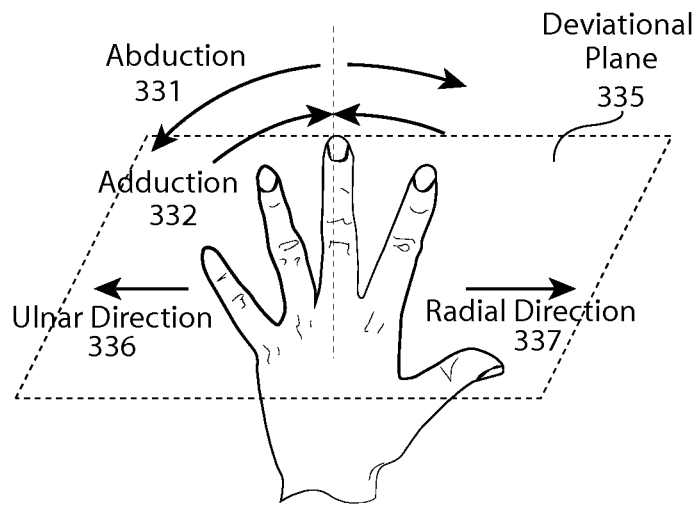

FIG. 3D is a diagram illustrating finger abduction and adduction according to at least one example embodiment. Finger adduction and abduction relates to movement of fingers in relation to the middle finger. For example, abduction relates to movement of the fingers away from the middle finger, and adduction relates to movement of the fingers towards the middle finger. For example, it can be seen that abduction 331 relates to spreading the fingers away from each other, and adduction 332 relates to bringing the fingers towards each other. It can be seen that finger adduction 331 may relate to movement in a deviational plane direction. For example, abduction of the thumb and index finger may relate to movement in radial direction 337. Similarly, adduction of the ring finger and pinky finger may relate to movement in radial direction 337. Likewise, adduction of the thumb and index finger may relate to movement in ulnar direction 336. Similarly, abduction of the ring finger and pinky finger may relate to movement in ulnar direction 336.

Figure 3E:
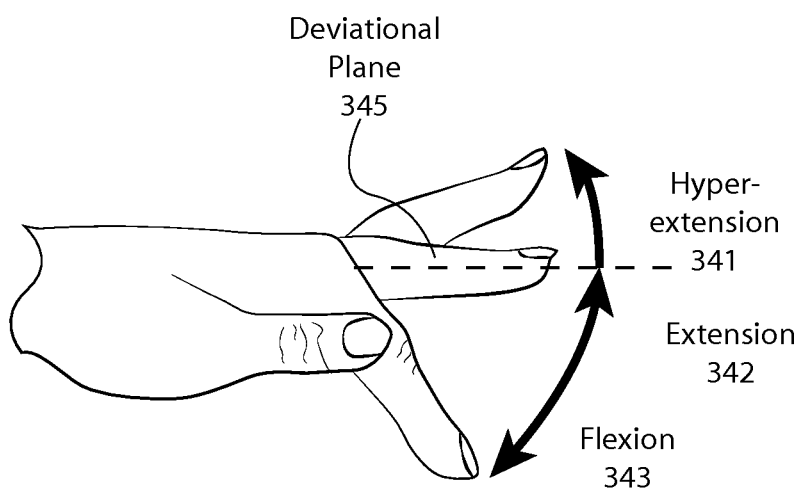

FIG. 3E is a diagram illustrating finger flexion and extension according to at least one example embodiment. It can be seen that finger extension relates to a finger movement associated with bringing the top of the finger towards the top of the hand and that finger flexion relates to bringing the bottom of the finger towards the palm of the hand. FIG. 3E illustrates finger extension 342 and finger flexion 343 in relation to deviational plane 345. It can be seen that finger hyper-extension 341 relates to a motion in a direction extending above deviational plane 345 and that finger flexion 343 relates to a motion in a direction below deviational plane 325. In at least one example embodiment, finger hyper-extension relates to finger extension that causes the finger to become above the deviational plane. In at least one example embodiment, a physical movement that comprises finger flexion or finger hyper-extension relates to a motion that has a deviational plane direction that is a geometric normal to the deviational plane. For example, finger flexion may relate to a deviational plane direction of a geometric normal below the deviational plane. In another example, finger hyper-extension may relate to a deviational plane direction of a geometric normal above the deviational plane.

In some circumstances, it may be desirable to evaluate wrist and/or hand movement and to treat such movement as an input for an apparatus. For example, a user may desire to provide input using a single hand, may desire to provide input without touching an apparatus, and/or the like. For example, the apparatus may be difficult for the user to reach with his hand when the apparatus is in use. In such an example, the user may desire to perform input for the apparatus by way of wrist and/or hand movement.

In such circumstances, it may be desirable to monitor physical movement in a deviational plane direction, and to treat such movement as a deviational plane wrist input. In at least one example embodiment, a deviational plane wrist input relates to an input that is indicative of physical movement in a deviational plane direction. The apparatus may evaluate the deviational plane direction and perform various operations based, at least in part, on the deviational plane direction indicated by the deviational plane wrist input.

In at least one example embodiment, a deviational plane wrist input relates to a physical movement that is characterized by a change from a neutral physical position with respect to the deviational plane to a non-neutral physical position with respect to the deviational plane. The non-neutral physical position relates to a wrist extension position, a wrist flexion position, an ulnar deviation position, a radial deviation position, a finger abduction position, and/or the like. In at least one example embodiment, the deviational plane direction indicated by the deviational plane wrist input is independent of finger flexion and/or extension. For example, the deviational plane wrist input may disregard deviational direction information associated with finger flexion and/or extension.

Figure 4A:
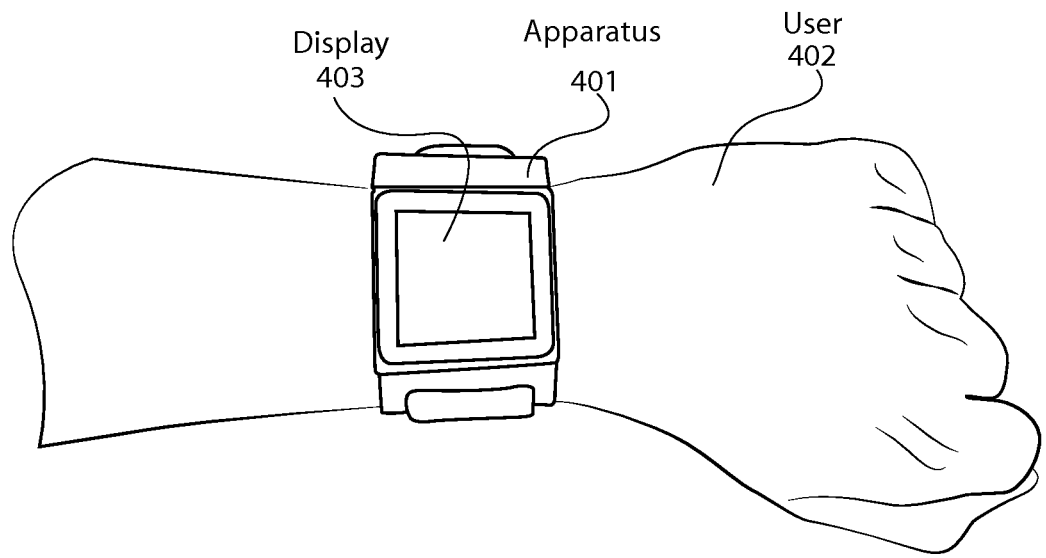
FIGS. 4A-4B are diagrams illustrating a wrist display according to at least one example embodiment.
Figure 4B:
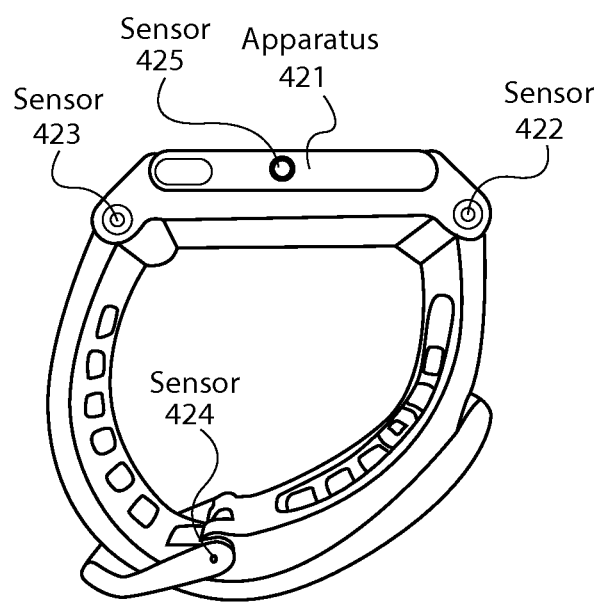

FIGS. 4A-4B are diagrams illustrating a wrist display according to at least one example embodiment. The examples of FIGS. 4A-4B are merely examples and do not limit the scope of the claims. For example, configuration of the display may vary, coupling of the display to the wrist may vary, design of the apparatus may vary, and/or the like.

In some circumstances, an apparatus form factor may be associated with difficulties in performance of inputs that involve touching of the apparatus by a hand. For example, a wrist mounted apparatus may benefit from providing a manner of input that does not necessarily involve touching an input device of the apparatus to perform the input, such as a deviational plane wrist input.

FIG. 4A is a diagram illustrating a wrist display according to at least one example embodiment. It can be seen that display 403 is housed by apparatus 401 in a manner that allows the display to be worn proximate to the wrist of user 402. It can be seen that display 403 is configured to be oriented on the wrist of user 402. For example, the display may be oriented such that when user 402 pronates the wrist of apparatus 401 and brings the wrist to align with the sagittal axis, display 403 may be viewed by the user. In such a position, display 403 may be oriented such that the top of display 403 is further from the torso of user 402 than the bottom of display 403. In this manner, the display may be oriented similar to the orientation of a watch. For example, the top of the display may be proximate to the ulna bone of the wrist on which the display is worn, and bottom of the display may be proximate to the radius bone of the wrist on which the display is worn.

In this manner, it can be seen that the display may be configured to be worn such that the display is substantially parallel with the deviational plane. For example, the housing of the display, such as apparatus 401, may be configured such that the display is substantially parallel with the deviational plane of the wrist on which the display is worn. It can be seen that the deviational plane of the wrist of user 402 on which display 403 is worn is substantially parallel with display 403. In at least one example embodiment, substantially parallel relates to the display being parallel within an amount of deviation attributable to shifting of the apparatus upon the wrist of the user. For example, it may be desirable to avoid apparatus 401 being tight enough to avoid slipping in a manner that allows for deviation from being parallel with the deviational plane. For example, it may be desirable to avoid causing damage to the wrist due to tightness on the wrist capable of avoiding such slipping.

In many circumstances, it may be desirable for a deviational plane wrist input to be an intuitive manner for providing an input that is indicative of a direction on the display. In at least one example embodiment, a direction on a display that is communicated by an input relates to an interactional direction. For example, an input that communicates an interaction in an upward direction relates to an upward interactional direction. It may be desirable for a user to readily associate a deviational plane direction with an interaction direction. In this manner, it may be desirable for an apparatus to leverage the similarity between alignment of the display and the alignment of the deviational plane of the wrist on which the display is worn. For example, it can be seen that the top of display 403, being proximate to the ulna bone of user 402, is in an ulnar direction from the center of display 403. Likewise, it can be seen that the bottom of display 403, being proximate to the radius bone of user 402, is in a radial direction from the center of display 403. In at least one example embodiment, the interaction direction corresponds with the deviational plane direction. In this manner, an upward interaction direction may correspond with an ulnar deviational plane direction. For example, a user may perform an ulnar deviation of the wrist, a pinky finger abduction, and/or the like, to perform a deviational plane wrist input that corresponds with an upward interaction direction. Similarly, a downward interaction direction may correspond with a radial deviational plane direction. For example, a user may perform a radial deviation of the wrist, a thumb abduction, and/or the like, to perform a deviational plane wrist input that corresponds with a downward interaction direction. In this manner, the wrist movement associated with vertical interaction direction may align with a radial direction and an ulnar direction on the deviational plane.

In some circumstances, it may be difficult for a user to perform a movement that is along the deviational plane in a direction that is perpendicular to the radial direction and the ulnar direction. In this manner, it may be desirable to associate movement above the deviational plane and below the deviation plane with a horizontal interaction direction. For example, it may be desirable to associate movement below the deviational plane to correspond with an interaction movement towards the hand and for movement above the deviational plane to correspond with an interaction movement away from the hand. In at least one example embodiment, a rightward interaction direction corresponds with the geometric normal below the deviational plane. For example, a wrist flexion may relate to a rightward interaction direction. In at least one example embodiment, a leftward interaction direction corresponds with the geometric normal above the deviational plane. For example, a wrist extension may relate to a leftward interaction direction. However, rightwardness and leftwardness may further depend on which wrist the display is worn. For example, if the display is worn on the left wrist, movement towards the hand relates to a rightward interaction direction. However, if the display is worn on the right wrist, movement towards the hand relates to a leftward interaction direction.

In at least one example embodiment, the apparatus determines the interaction direction based, at least in part, on the deviational plane direction. For example, the apparatus may determine the interaction direction based, at least in part, on correlation between the deviational plane and the display. The correlation may be based, at least in part, on a calculation performed with regards to the deviational plane direction, on a predetermined correlation table, on a predetermined set of program instructions that presume a correlation, and/or the like.

In at least one example embodiment, the apparatus comprises one or more sensors for detecting a deviational plane wrist input. For example, the apparatus may comprise one or more biometric sensors that monitor biological signals of the wrist, such as tendon movement, ligament movement, nerve signals, and/or the like. In another example, the apparatus may track objects attached to one or more parts of the hand. For example, the apparatus may comprise a magnetic field sensor that tracks magnetic fields of one or more devices that are worn on one or more parts of the hand. In another example, the apparatus may comprise one or more visual sensors, proximity sensors, motion sensors, heat sensors, light sensors, and/or the like that are configured to detect movement of the hand in relation to the apparatus.

FIG. 4B is a diagram illustrating a wrist display according to at least one example embodiment. The example of FIG. 4B illustrates apparatus 421 comprising sensors 422, 423, 424 and 425. Sensors 422, 423, 424, and 425 may relate to motion sensors, proximity sensors, and/or the like that are positioned to detect movement in a radial direction, an ulnar direction, a direction upward from the deviational plane, a direction downward from the deviational plane, and/or the like. For example, the position of sensor 423 may be such that a movement in a radial direction relates to increased proximity of the hand towards sensor 423. Similarly, the position of sensor 422 may be such that a movement in an ulnar direction relates to increased proximity of the hand towards sensor 422. The position of sensor 424 may be such that a movement in a direction below the deviational plane relates to increased proximity of the hand towards sensor 424. Similarly, the position of sensor 425 may be such that a movement in a direction above the deviational plane relates to increased proximity of the hand towards sensor 425.

Figure 5A:
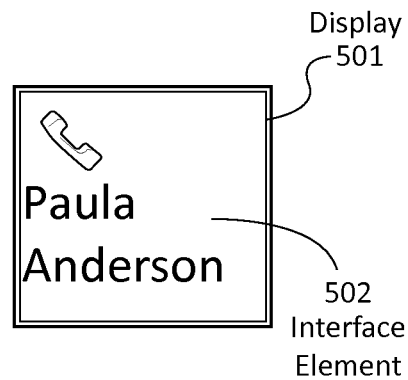
FIGS. 5A-5C are diagrams illustrating interface elements according to at least one example embodiment.
Figure 5B:
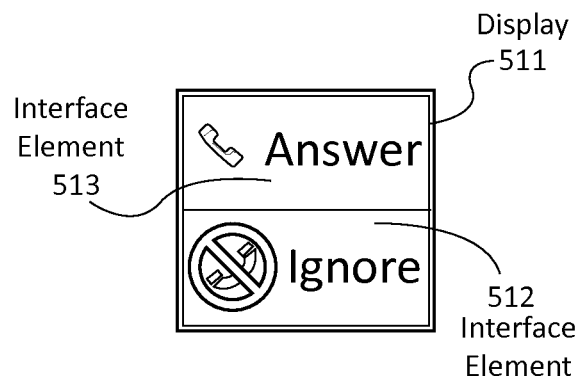
Figure 5C:
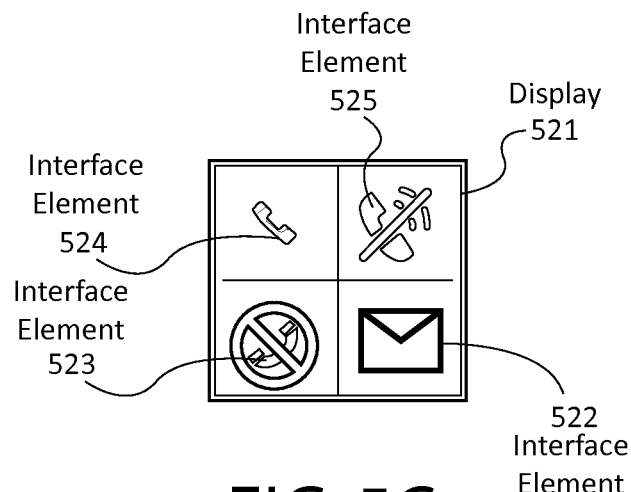

FIGS. 5A-5C are diagrams illustrating interface elements according to at least one example embodiment. The examples of FIGS. 5A-5C are merely examples and do not limit the scope of the claims. For example, number of interface elements may vary, arrangement of interface elements may vary, and/or the like.

In some circumstances, it may be desirable to provide for interface elements that allow the user to understand how to interact with the apparatus, how an interaction may affect the apparatus, and/or the like. In at least one example embodiment, an interface element relates to a visual representation of information indicative of an operation that the apparatus may perform. An interface element may relate to a selectable item such that a selection input corresponding to the interface element causes performance of an operation. The operation may relate to invocation of a program, invocation of a function of a program, and/or the like. The interface element may comprise information indicative of the operation. For example, an interface element associated with an operation for answering a phone call may comprise visual information indicative of answering the phone call, such as a phone icon, and answer icon, and/or the like.

In at least one example embodiment, the apparatus determines an interaction operation based, at least in part, on an interface element and an interaction direction. For example, the apparatus may determine that the interface element corresponds with the interaction direction. In at least one example embodiment, correspondence between an interface element and an interaction direction relates to determination that a position indicated by the interaction direction relates to the interface element. For example, the interaction direction may indicate a position based, at least in part, on an application of an offset from a center of the display in the interaction direction. For example, the interaction direction may relate to an upward interaction direction. In such an example, the interaction direction may indicate a position of the display that corresponds with an offset from the center of the display in an upward direction.

Upon determination of the interaction operation, the apparatus may cause performance of the interaction operation. Causation of performance may relate to performance of the interaction operation by the apparatus, sending information to another apparatus to cause the other apparatus to perform the interaction operation, and/or the like. For example, the apparatus may execute operations associated with a determined interaction operation. In at least one example embodiment, the interaction operation relates to an operation associated with interaction in relation to one or more interface elements. For example, the interaction operation may relate to a selection operation. In at least one example embodiment the selection operation relates to selection of an interface element. For example, the selection of the interface element may invoke an operation associated with the interface element. In at least one example embodiment, the interaction operation relates to causation of display of menu item interface elements. For example, the interface element may relate to a menu of other interface elements. For example, interface element 502 of FIG. 5A may relate to an interaction operation associated with causation of display of interface elements 512 and 513 of FIG. 5B. In this manner, an interface element may relate to a menu item associated with a selected interface element.

In at least one example embodiment, the apparatus may determine an interface element to be displayed based, at least in part, on occurrence of an event. For example, the event may relate to a receipt of a call, a receipt of a message, a calendar event, an alarm event, and/or the like. In such an example, the interface element may relate to a notification of occurrence of the event. For example the interface element may relate to a notification that there is an incoming call, that a message has been received, that a time associated with a calendar event has occurred, that a time associated with an alarm has occurred, and/or the like.

FIG. 5A is a diagram illustrating an interface element according to at least one example embodiment. It can be seen that the example of FIG. 5A relates to interface element 502 being displayed on display 501. It can be seen in the example of FIG. 5A, that display 501 is displaying a single interface element, interface element 502. In at least one example embodiment, any interaction direction may relate to selection of interface element 502. For example, an upward interaction direction, a downward interaction direction, a leftward interaction direction, a rightward interaction direction, and/or the like, may be associated with a selection interaction operation associated with interface element 502. In at least one example, the apparatus may limit which interaction direction may be associated with a single interface element on a display. For example, the apparatus may limit determination of correspondence between an interaction direction and an interface item to a rightward interaction direction. In such an example, the apparatus may determine an interaction operation of selection of interface element 502 based, at least in part, on a wrist flexion deviational plane wrist input, and may avoid determination of the interaction operation of selection of interface element 502 based, at least in part, on a different deviational plane wrist input.

Interface element 502 may relate to a notification interface element. For example, interface element 502 may serve to notify a user of occurrence of an event, such as receipt of a call. In this manner, a selection of the notification event may cause the apparatus to answer the call, to cause display of menu items associated with the notification interface element, and/or the like.

FIG. 5B is a diagram illustrating interface elements according to at least one example embodiment. The example of FIG. 5B relates to a plurality of interface elements being displayed on display 511. It can be seen that interface element 513 is displayed above interface element 512. In this manner, an upward interaction direction may correspond with interface element 513. For example, a deviational plane wrist input in an ulnar direction may relate an interaction direction that corresponds with interface element 513. Similarly, a downward interaction direction may correspond with interface element 512. For example, a deviational plane wrist input in a radial direction may relate an interaction direction that corresponds with interface element 513.

Interface elements 512 and 513 may relate to menu items of a different interface element, such as interface element 502 of FIG. 5A. For example, selection of interface element 502 may cause the apparatus to display interface elements 512 and 513. In this manner, interface elements 512 and 513 may relate to operations that the apparatus may perform in relation to the event of interface element 502. For example, interface item 513 may relate to an operation associated with answering an incoming call, and interface item 512 may relate to an operation associated with ignoring the incoming call, such as terminating an alert, terminating a notification, and/or the like.

FIG. 5C is a diagram illustrating interface elements according to at least one example embodiment. The example of FIG. 5C relates to a plurality of interface elements being displayed on display 521. It can be seen that interface element 525 is displayed above interface element 522 and to the right of interface element 524. In this manner, an upward rightward interaction direction may correspond with interface element 525. For example, a deviational plane wrist input in an ulnar direction and below the deviational plane may relate an interaction direction that corresponds with interface element 525.

It can be seen that interface element 522 is displayed below interface element 525 and to the right of interface element 523. In this manner, a downward rightward interaction direction may correspond with interface element 522. For example, a deviational plane wrist input in a radial direction and below the deviational plane may relate an interaction direction that corresponds with interface element 522.

It can be seen that interface element 524 is displayed above interface element 523 and to the left of interface element 525. In this manner, an upward leftward interaction direction may correspond with interface element 524. For example, a deviational plane wrist input in an ulnar direction and above the deviational plane may relate an interaction direction that corresponds with interface element 524.

It can be seen that interface element 523 is displayed below interface element 524 and to the left of interface element 522. In this manner, a downward leftward interaction direction may correspond with interface element 523. For example, a deviational plane wrist input in a radial direction and above the deviational plane may relate an interaction direction that corresponds with interface element 523.

Interface elements 522, 523, 524, and 525 may relate to menu items of a different interface element, such as interface element 502 of FIG. 5A. For example, selection of interface element 502 may cause the apparatus to display interface elements 522, 523, 524, and 525. In this manner, interface elements 522, 523, 524, and 525 may relate to operations that the apparatus may perform in relation to the event of interface element 502. For example, interface item 524 may relate to an operation associated with answering an incoming call. In another example, interface item 523 may relate to an operation associated with ignoring the incoming call, such as terminating an alert, terminating a notification, and/or the like. In still another example, interface item 525 may relate to an operation associated with muting an audible alert associated with the incoming call. In yet another example, interface item 522 may relate to an operation associated with sending a message to the caller of an incoming call.

FIG. 6 is a flow diagram illustrating activities associated with a deviational plane wrist input according to at least one example embodiment. In at least one example embodiment, there is a set of operations that corresponds with the activities of FIG. 6. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 6.

At block 602, the apparatus causes display of at least one interface element on a display that is configured to be oriented on a wrist of a user. The causation of display, the interface element, and the orientation may be similar as described regarding FIGS. 4A-4B, FIGS. 5A-5B, and/or the like.

At block 604, the apparatus receives information indicative of a deviational plane wrist input indicative of physical movement in a deviational plane direction. The deviational plane wrist input, the physical movement, and the deviational plane direction may be similar as described regarding FIGS. 3A-3E, FIGS. 4A-4B, and/or the like.

At block 606, the apparatus determines an interaction operation based, at least in part, on the interface element and an interaction direction that corresponds with the deviational plane direction. The determination, the interaction operation, and the interaction direction may be similar as described regarding FIGS. 4A-4B, FIGS. 5A-5C, and/or the like.

At block 608, the apparatus causes performance of the interaction operation. The causation and the performance may be similar as described regarding FIGS. 5A-5C.

FIG. 7 is a flow diagram illustrating activities associated with a deviational plane wrist input according to at least one example embodiment. In at least one example embodiment, there is a set of operations that corresponds with the activities of FIG. 7. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 7.

At block 702, the apparatus causes display of at least one interface element on a display that is configured to be oriented on a wrist of a user, similarly as described regarding block 602 of FIG. 6. At block 704, the apparatus receives information indicative of a deviational plane wrist input indicative of physical movement in a deviational plane direction, similarly as described regarding block 604 of FIG. 6.

At block 706, the apparatus determines an interaction direction based, at least in part, on the deviational plane direction. The determination and the interaction direction may be similar as described regarding FIGS. 4A-4B.

At block 708, the apparatus determines an interaction operation based, at least in part, on the interface element and the interaction direction. The determination and the interaction operation may be similar as described regarding FIGS. 4A-4B, FIGS. 5A-5C, and/or the like.

At block 710, the apparatus causes performance of the interaction operation, similarly as described regarding block 608 of FIG. 6.

Figures 8, 9:
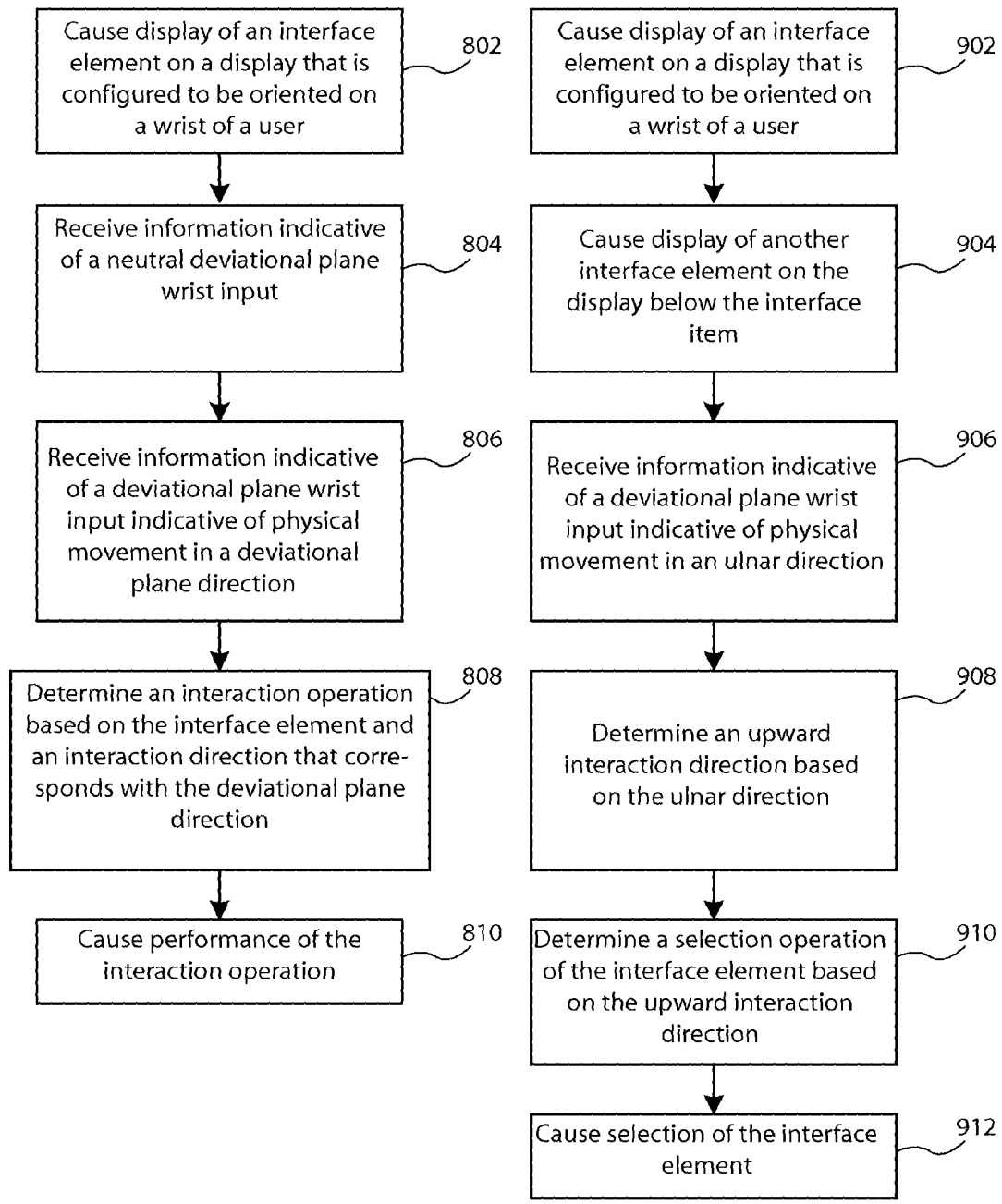
FIG. 8 is a flow diagram illustrating activities associated with a deviational plane wrist input according to at least one example embodiment.
FIG. 9 is a flow diagram illustrating activities associated with a deviational plane wrist input according to at least one example embodiment.

FIG. 8 is a flow diagram illustrating activities associated with a deviational plane wrist input according to at least one example embodiment. In at least one example embodiment, there is a set of operations that corresponds with the activities of FIG. 8. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 8.

In some circumstances, it may be desirable to avoid inadvertent deviational plane wrist input. For example, there may be circumstances, where the apparatus causes display of an interface element while the wrist is in a position indicative of a deviational plane wrist input. In such circumstances, it may be desirable to avoid determination of an interaction operation until the apparatus receives a neutral deviational plane wrist input. In at least one example embodiment, a neutral deviational plane wrist input relates to the wrist being in a neutral position, as described regarding FIGS. 2A-2E. In at least one example, the neutral deviational plane wrist input relates to the wrist becoming oriented in a neutral position, as described regarding FIGS. 2A-2E. For example, a neutral deviational plane wrist input may relate to a wrist movement from a non-neutral position to a neutral position.

At block 802, the apparatus causes display of at least one interface element on a display that is configured to be oriented on a wrist of a user, similarly as described regarding block 602 of FIG. 6. At block 804, the apparatus receives information indicative of a neutral deviational plane wrist input.

At block 806, the apparatus receives information indicative of a deviational plane wrist input indicative of physical movement in a deviational plane direction, similarly as described regarding block 604 of FIG. 6. In this manner the apparatus may await receipt of the neutral deviational plane input may predicate receipt of the deviational plane wrist input on prior receipt of the neutral deviational plane wrist input.

At block 808, the apparatus determines an interaction operation based, at least in part, on the interface element and an interaction direction that corresponds with the deviational plane direction, similarly as described regarding block 606 of FIG. 6. At block 810, the apparatus causes performance of the interaction operation, similarly as described regarding block 608 of FIG. 6.

FIG. 9 is a flow diagram illustrating activities associated with a deviational plane wrist input according to at least one example embodiment. In at least one example embodiment, there is a set of operations that corresponds with the activities of FIG. 9. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 9.

At block 902, the apparatus causes display of at least one interface element on a display that is configured to be oriented on a wrist of a user, similarly as described regarding block 602 of FIG. 6. At block 904, the apparatus causes display of another interface element that is below the interface element. The causation of display, the other interface element, and the orientation may be similar as described regarding FIGS. 4A-4B, FIGS. 5A-5B, and/or the like.

At block 906, the apparatus receives information indicative of a deviational plane wrist input indicative of physical movement in an ulnar direction. The receipt, the deviational plane wrist input, and the ulnar direction may be similar as described regarding FIGS. 3A-3E.

At block 908, the apparatus determines an upward interaction direction based, at least in part, on the ulnar direction. The determination and the upward interaction direction may be similar as described regarding FIGS. 4A-4B, FIGS. 5A-5C, and/or the like.

At block 910, the apparatus determines a selection interaction operation of the interface element based, at least in part, on the upward interaction direction. The determination and the selection interaction operation may be similar as described regarding FIGS. 4A-4B, FIGS. 5A-5C, and/or the like.

At block 912, the apparatus causes selection of the interface element. Selection of the interface element may be similar as described regarding FIGS. 5A-5C.

Even though the example of FIG. 9 relates to a deviational plane wrist input indicative of physical movement in an ulnar direction, an upward interaction direction, and the selection operation of the interface element, another example may relate to a deviational plane wrist input indicative of physical movement in a radial direction, a downward interaction direction, and a selection operation of the other interface element.

Figure 10:
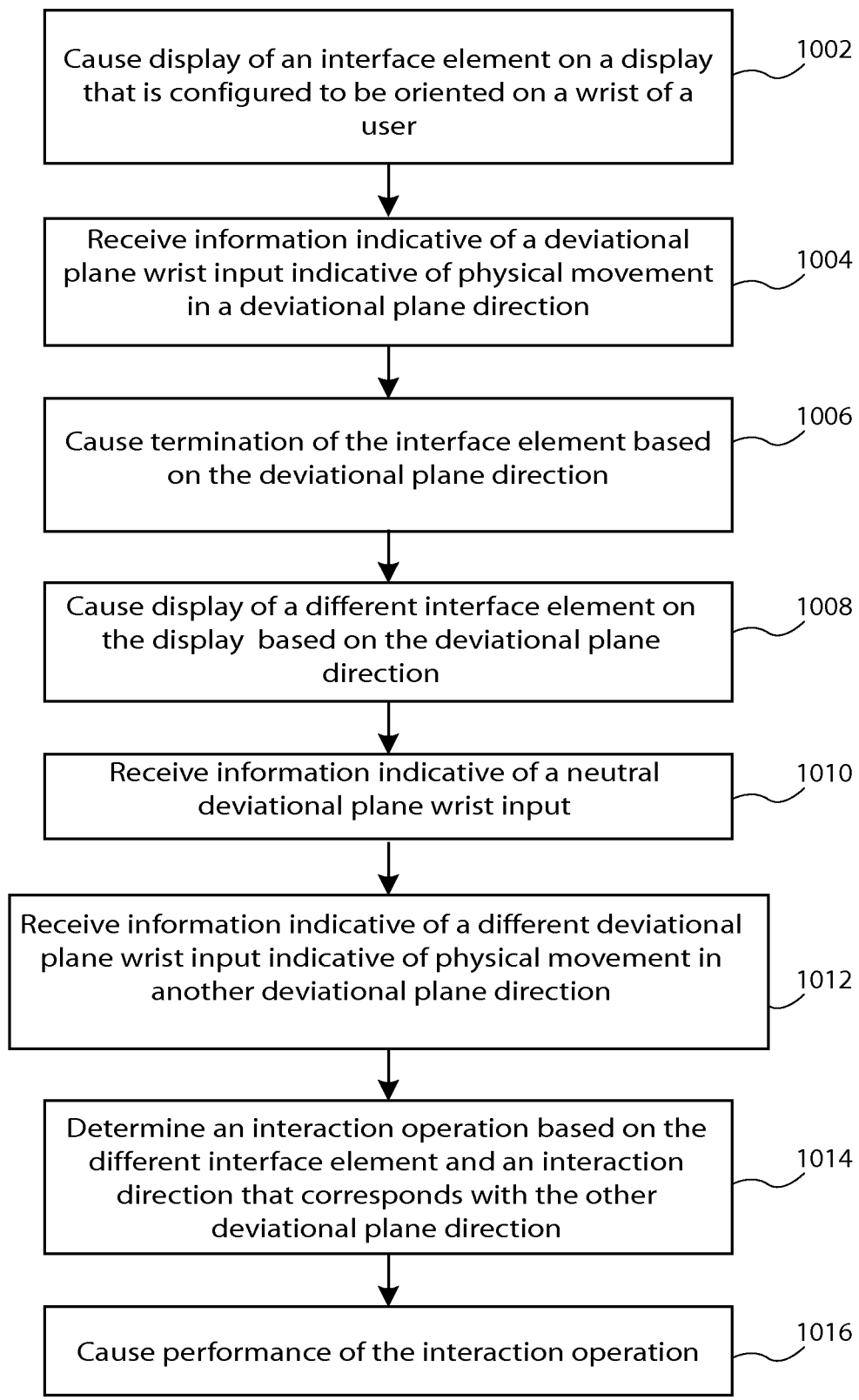
FIG. 10 is a flow diagram illustrating activities associated with a deviational plane wrist input according to at least one example embodiment.

FIG. 10 is a flow diagram illustrating activities associated with a deviational plane wrist input according to at least one example embodiment. In at least one example embodiment, there is a set of operations that corresponds with the activities of FIG. 10. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 10.

At block 1002, the apparatus causes display of at least one interface element on a display that is configured to be oriented on a wrist of a user, similarly as described regarding block 602 of FIG. 6. At block 1004, the apparatus receives information indicative of a deviational plane wrist input indicative of physical movement in a deviational plane direction, similarly as described regarding block 604 of FIG. 6.

At block 1006, the apparatus causes termination of display of the interface element based, at least in part, on the deviational plane wrist input. At block 1008, the apparatus causes display of at least one different interface element. The different interface element may be based, at least in part, on the interface element. For example the interface element may relate to interface element 502 of FIG. 5, and the other interface element may relate to interface element 513 of FIG. 5B. In this manner, the different interface element may relate to a menu item associated with the interface element.

At block 1010, the apparatus receives information indicative of a neutral deviational plane wrist input, similarly as described regarding block 804 of FIG. 8.

At block 1012, the apparatus receives information indicative of a different deviational plane wrist input indicative of a physical movement in another deviational plane direction. The different deviational plane wrist input and the other deviational plane direction may be similar as described regarding FIGS. 3A-3E, FIGS. 4A-4B, and/or the like.

At block 1014, the apparatus determines an interaction operation based, at least in part, on the different interface element and an interaction direction that corresponds with the deviational plane direction. The determination, the interaction operation, and the interaction direction may be similar as described regarding FIGS. 4A-4B, FIGS. 5A-5C, and/or the like. At block 1016, the apparatus causes performance of the interaction operation, similarly as described regarding block 608 of FIG. 6.

Figure 11:
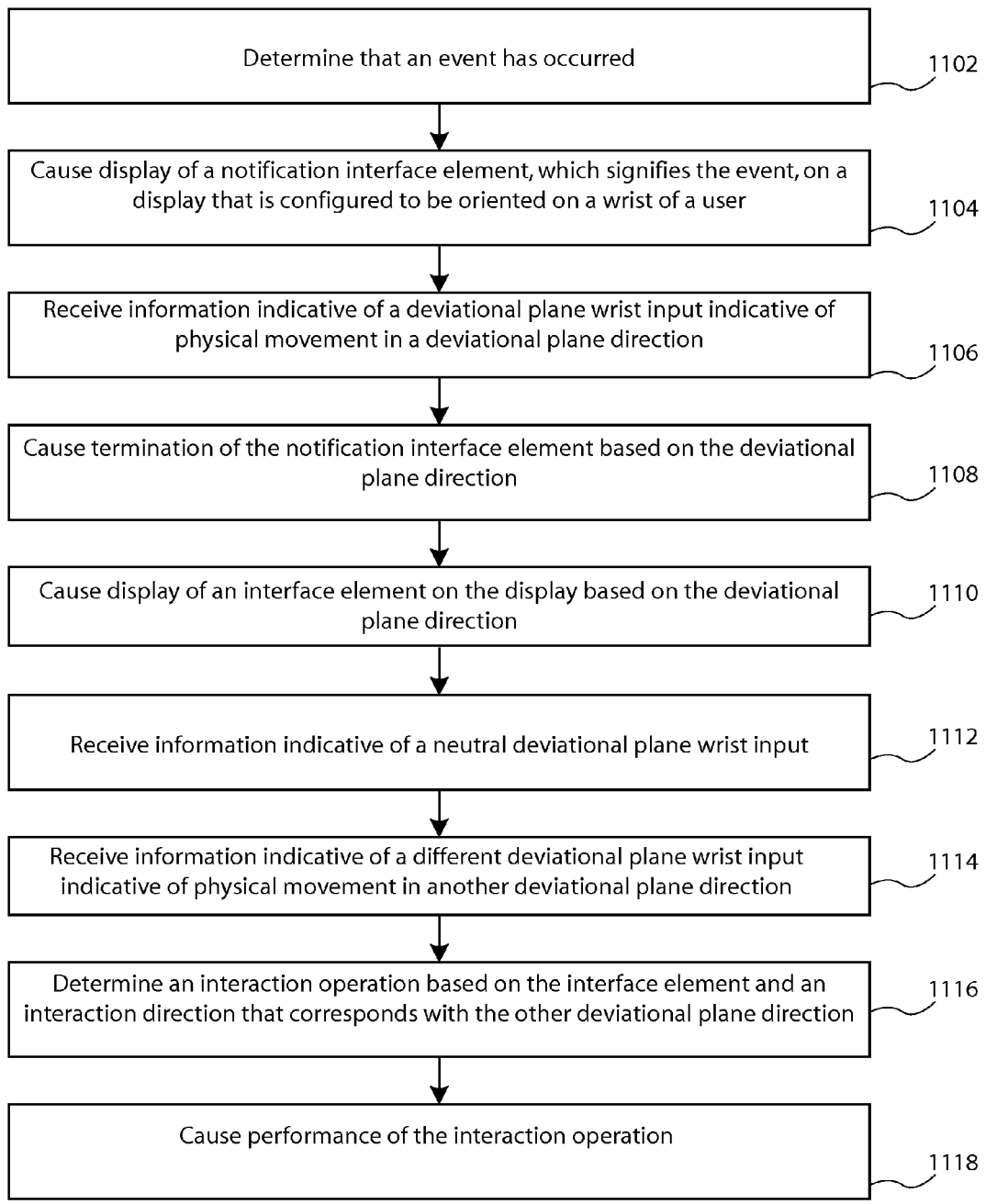
FIG. 11 is a flow diagram illustrating activities associated with a deviational plane wrist input according to at least one example embodiment.

FIG. 11 is a flow diagram illustrating activities associated with a deviational plane wrist input according to at least one example embodiment. In at least one example embodiment, there is a set of operations that corresponds with the activities of FIG. 11. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 11.

At block 1102, the apparatus determines that an event occurred. The determination, the event, and the occurrence may be similar as described regarding FIGS. 5A-5C.

At block 1104, the apparatus causes display of a notification interface element, which signifies the event, on a display that is configured to be oriented on a wrist of a user. The causation of display, the notification interface element, and the orientation may be similar as described regarding FIGS. 4A-4B, FIGS. 5A-5B, and/or the like.

At block 1106, the apparatus determines an interaction operation based, at least in part, on the interface element and an interaction direction that corresponds with the deviational plane direction, similarly as described regarding block 606 of FIG. 6. At block 1108, the apparatus causes termination of display of the notification interface element based, at least in part, on the deviational plane direction, similarly as described regarding block 1006 of FIG. 10.

At block 1110, the apparatus causes display of at least one interface element. The interface element may be based, at least in part, on the notification interface element. For example the notification interface element may relate to interface element 502 of FIG. 5, and the interface element may relate to interface element 513 of FIG. 5B. In this manner, the different interface element may relate to a menu item associated with the notification interface element.

At block 1112, the apparatus receives information indicative of a neutral deviational plane wrist input, similarly as described regarding block 804 of FIG. 8. At block 1114, the apparatus receives information indicative of a different deviational plane wrist input indicative of a physical movement in another deviational plane direction. The different deviational plane wrist input and the other deviational plane direction may be similar as described regarding FIGS. 3A-3E, FIGS. 4A-4B, and/or the like.

At block 1116, the apparatus determines an interaction operation based, at least in part, on the different interface element and an interaction direction that corresponds with the deviational plane direction. The determination, the interaction operation, and the interaction direction may be similar as described regarding FIGS. 4A-4B, FIGS. 5A-5C, and/or the like. At block 1118, the apparatus causes performance of the interaction operation, similarly as described regarding block 608 of FIG. 6.

Figure 12:
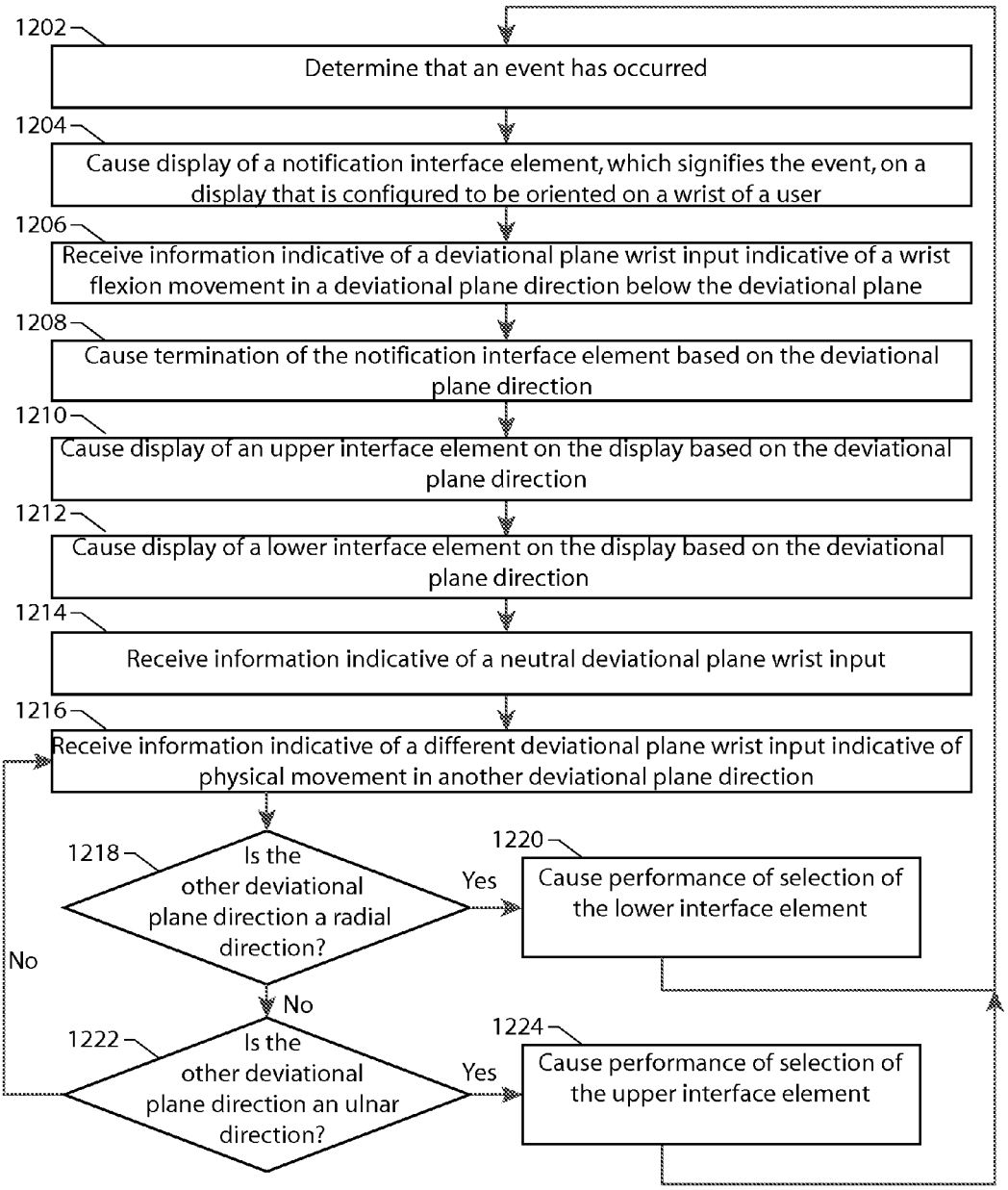
FIG. 12 is a flow diagram illustrating activities associated with a deviational plane wrist input according to at least one example embodiment.

FIG. 12 is a flow diagram illustrating activities associated with a deviational plane wrist input according to at least one example embodiment. In at least one example embodiment, there is a set of operations that corresponds with the activities of FIG. 12. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 12.

At block 1202, the apparatus determines that an event occurred, similarly as described regarding block 1102 of FIG. 11. At block 1204, the apparatus causes display of a notification interface element, which signifies the event, on a display that is configured to be oriented on a wrist of a user, similarly as described regarding block 1104 of FIG. 11.

At block 1206, the apparatus receives information indicative of a deviational plane wrist input indicative of a wrist flexion movement in a deviational plane direction below the deviational plane. The deviational plane wrist input, the wrist flexion movement, and the deviational plane direction may be similar as described regarding FIGS. 3A-3E, FIGS. 4A-4B, and/or the like.

At block 1208, the apparatus causes termination of display of the notification interface element based, at least in part, on the deviational plane direction, similarly as described regarding block 1006 of FIG. 10.

At block 1210, the apparatus causes display of an upper interface element based on the deviational plane direction. For example, the notification interface element may relate to interface element 502 of FIG. 5, and the upper interface element may relate to interface element 513 of FIG. 5B. In this manner, the upper interface element may relate to a menu item associated with the notification interface element.

At block 1212, the apparatus causes display of a lower interface element based on the deviational plane direction. For example, the notification interface element may relate to interface element 502 of FIG. 5, and the lower interface element may relate to interface element 512 of FIG. 5B. In this manner, the lower interface element may relate to a menu item associated with the notification interface element.

At block 1214, the apparatus receives information indicative of a neutral deviational plane wrist input, similarly as described regarding block 804 of FIG. 8.

At block 1216, the apparatus receives information indicative of a different deviational plane wrist input indicative of physical movement in a different deviational plane direction. The different deviational plane wrist input, the physical movement, and the different deviational plane direction may be similar as described regarding FIGS. 3A-3E, FIGS. 4A-4B, and/or the like.

At block 1218, the apparatus determines whether the deviational plane direction relates to a radial direction. If the apparatus determines that the deviational plane direction relates to a radial direction, flow proceeds to block 1220. If the apparatus determines that the deviational plane direction fails to relate to a radial direction, flow proceeds to block 1222.

At block 1220, the apparatus causes performance of selection of the lower interface element. The performance of the selection may be similar as described regarding FIGS. 5A-5C. In this manner, the selection of the lower interface element may be based, at least in part, on the deviational plane direction being in a radial direction. Flow may return to block 1202.

At block 1222, the apparatus determines whether the deviational plane direction relates to an ulnar direction. If the apparatus determines that the deviational plane direction relates to an ulnar direction, flow proceeds to block 1224. If the apparatus determines that the deviational plane direction fails to relate to an ulnar direction, flow returns to block 1216.

At block 1224, the apparatus causes performance of selection of the upper interface element. The performance of the selection may be similar as described regarding FIGS. 5A-5C. In this manner, the selection of the upper interface element may be based, at least in part, on the deviational plane direction being in an ulnar direction. Flow may return to block 1202.

Embodiments of the invention may be implemented in software, hardware, application logic or a combination of software, hardware, and application logic. The software, application logic and/or hardware may reside on the apparatus, a separate device, or a plurality of separate devices. If desired, part of the software, application logic and/or hardware may reside on the apparatus, part of the software, application logic and/or hardware may reside on a separate device, and part of the software, application logic and/or hardware may reside on a plurality of separate devices. In an example embodiment, the application logic, software or an instruction set is maintained on any one of various conventional computer-readable media.

If desired, the different functions discussed herein may be performed in a different order and/or concurrently with each other. For example, block 1208 of FIG. 12 may be performed after block 1210. Furthermore, if desired, one or more of the above-described functions may be optional or may be combined. For example, block 1214 of FIG. 12 may be optional and/or combined with block 1216.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are variations and modifications which may be made without departing from the scope of the present invention as defined in the appended claims.

What is claimed is:

1. An apparatus, comprising:
   at least one processor;
   at least one memory including computer program code, the memory and the computer program code configured to, working with the processor, cause the apparatus to perform at least the following:
   cause display of at least one interface element on a display that is configured to be oriented on a wrist of a user such that a top of the display is proximate to an ulna of the user and a bottom of the display is proximate to a radius of the user;
   receive information indicative of a deviational plane wrist input indicative of physical movement in a deviational plane direction, the deviational plane being a plane that aligns with radial deviation of the wrist and ulnar deviation of the wrist, the deviational plane direction being a direction with respect to the deviational plane;
   determine an interaction operation based, at least in part, on the interface element and an interaction direction that corresponds with the deviational plane direction; and
   cause performance of the interaction operation.

2. The apparatus of claim 1, wherein the deviational plane aligns with radial deviation of the wrist and ulnar deviation of the wrist regardless of supination of the wrist and regardless of pronation of the wrist.

3. The apparatus of claim 1, wherein the memory includes computer program code configured to, working with the processor, cause the apparatus to perform determination of the interaction direction based, at least in part, on the deviational plane direction.

4. The apparatus of claim 1, wherein the memory includes computer program code configured to, working with the processor, cause the apparatus to perform receipt of information indicative of a neutral deviational plane wrist input.

5. The apparatus of claim 1, wherein the memory includes computer program code configured to, working with the processor, cause the apparatus to perform:
   causation of display of at least one different interface element;
   receipt of information indicative of a different deviational plane wrist input, wherein the interface element is based, at least in part, on the different interface element and the different deviational plane wrist input; and
   causation of termination of display of the different interface element based, at least in part, on the different deviational plane wrist input, wherein the causation of display of the interface element is based, at least in part, on the different deviational plane wrist input.

6. The apparatus of claim 5, wherein the memory includes computer program code configured to, working with the processor, cause the apparatus to perform determination that an event occurred, wherein the different interface element relates to a notification of occurrence of the event.

7. The apparatus of claim 1, wherein the memory includes computer program code configured to, working with the processor, cause the apparatus to perform causation of display of another interface element that is below the interface element, wherein the deviational plane wrist input direction relates to an ulnar direction, the interaction direction relates to an upward direction, and the interaction operation relates to selection of the interface element.

8. The apparatus of claim 1, wherein determination of the interaction operation comprises determination that the interface element corresponds with the interaction direction.

9. The apparatus of claim 1, wherein the apparatus comprises the display.

10. A method comprising:
    causing display of at least one interface element on a display that is configured to be oriented on a wrist of a user such that a top of the display is proximate to an ulna of the user and a bottom of the display is proximate to a radius of the user;
    receiving information indicative of a deviational plane wrist input indicative of physical movement in a deviational plane direction, the deviational plane being a plane that aligns with radial deviation of the wrist and ulnar deviation of the wrist, the deviational plane direction being a direction with respect to the deviational plane;
    determining an interaction operation based, at least in part, on the interface element and an interaction direction that corresponds with the deviational plane direction; and
    causing performance of the interaction operation.

11. The method of claim 10, wherein the deviational plane aligns with radial deviation of the wrist and ulnar deviation of the wrist regardless of supination of the wrist and regardless of pronation of the wrist.

12. The method of claim 10, further comprising determination of the interaction direction based, at least in part, on the deviational plane direction.

13. The method of claim 10, further comprising receipt of information indicative of a neutral deviational plane wrist input.

14. The method of claim 10, further comprising causation of display of another interface element that is below the interface element, wherein the deviational plane wrist input direction relates to an ulnar direction, the interaction direction relates to an upward direction, and the interaction operation relates to selection of the interface element.

15. The method of claim 10, further comprising:
causation of display of at least one different interface element;
receipt of information indicative of a different deviational plane wrist input, wherein the interface element is based, at least in part, on the different interface element and the different deviational plane wrist input; and
causation of termination of display of the different interface element based, at least in part, on the different deviational plane wrist input, wherein the causation of display of the interface element is based, at least in part, on the different deviational plane wrist input.

16. The method of claim 15, further comprising determination that an event occurred, wherein the different interface element relates to a notification of occurrence of the event.

17. At least one non-transitory computer-readable medium encoded with instructions that, when executed by a processor, perform:
cause display of at least one interface element on a display that is configured to be oriented on a wrist of a user such that a top of the display is proximate to an ulna of the user and a bottom of the display is proximate to a radius of the user;
receive information indicative of a deviational plane wrist input indicative of physical movement in a deviational plane direction, the deviational plane being a plane that aligns with radial deviation of the wrist and ulnar deviation of the wrist, the deviational plane direction being a direction with respect to the deviational plane;
determine an interaction operation based, at least in part, on the interface element and an interaction direction that corresponds with the deviational plane direction; and
cause performance of the interaction operation.

18. The medium of claim 17, wherein the deviational plane aligns with radial deviation of the wrist and ulnar deviation of the wrist regardless of supination of the wrist and regardless of pronation of the wrist.

19. The medium of claim 17, further encoded with instructions that, when executed by a processor, perform determination of the interaction direction based, at least in part, on the deviational plane direction.

20. The medium of claim 17, further encoded with instructions that, when executed by a processor, perform receipt of information indicative of a neutral deviational plane wrist input.

* * * * *